United States Patent [19]
Hickey et al.

[11] Patent Number: 5,130,976
[45] Date of Patent: Jul. 14, 1992

[54] BATCHER AND BANYAN SWITCHING ELEMENTS

[75] Inventors: Jason J. Hickey, West Orange; William S. Marcus, Short Hills, both of N.J.

[73] Assignee: Bell Communications Research, Inc., Livingston, N.J.

[21] Appl. No.: 654,270

[22] Filed: Feb. 12, 1991

[51] Int. Cl.$^5$ .............................................. H04J 3/02
[52] U.S. Cl. .................................... 370/60; 370/94.1
[58] Field of Search ........................ 370/60, 94.1, 67

[56] References Cited

U.S. PATENT DOCUMENTS

| | | | |
|---|---|---|---|
| 3,993,917 | 11/1976 | Kalter | 307/530 X |
| 4,910,730 | 3/1990 | Day, Jr. et al. | 370/60 |
| 4,918,686 | 4/1990 | Hayashi et al. | 370/94.1 X |
| 4,955,015 | 9/1990 | Lobjinski et al. | 370/60 X |
| 5,022,025 | 6/1991 | Urushidani et al. | 370/60 |
| 5,043,980 | 8/1991 | Day, Jr. et al. | 370/60 |

OTHER PUBLICATIONS

"Principles of CMOS VLSI Design", N. H. E. Weste & K. Eshrghian, Addison Wesley, Reading, Mass., pp. 439, 1985.

Primary Examiner—Benedict V. Safourek
Assistant Examiner—Russell W. Blum
Attorney, Agent, or Firm—Leonard Charles Suchyta; James W. Falk

[57] ABSTRACT

A 2×2 Batcher switching element (18) and a 2×2 banyan switching element (19) are formed utilizing dynamic charge storage devices (DL1, DL2, ILD0) and pipelined processing (100, 300). This enables the Batcher and banyan switching elements to be fast enough to switch data cells which are transmitted using the Asynchronous Transfer Mode.

9 Claims, 4 Drawing Sheets

FIG. 1
64 X 64 SWITCHING NETWORK

BATCHER AND BANYAN SWITCHING ELEMENTS

FIELD OF THE INVENTION

The present invention relates to high speed Batcher and banyan switching elements suitable for switching data cells transmitted using the Asynchronous Transfer Mode (ATM) technique.

BACKGROUND OF THE INVENTION

The Asynchronous Transfer Mode technique is a transmission technique for transmitting data through a trunk and exchange network. The ATM technique provides a uniform backbone transmission format which is used to transmit data belonging to a variety of applications such as high resolution video, voice communications and terminal and computer connections. An important advantage of the ATM technique is that different transmission formats are not needed in the trunk and exchange network for different applications, but rather a single format is suitable for multiple applications.

In the ATM transmission technique, data from various services are transmitted in small fixed length packets known as cells. Each ATM data cell has an address embedded in a header which identifies the destination of the cell. These data cells are inserted into slots which form the payload envelopes of the frames of a signal such as the Synchronous Optical Network (SONET) STS-3c or STS-12c signals. The technique is called the Asynchronous Transfer Mode because the individual slots of a frame are not synchronously reserved for specific applications, but instead, the individual slots of a frame are occupied by the data cells of the specific applications based on the current availability of slots and the current demand for transmission capacity by the specific applications.

Currently, ATM networks operate at a minimum of 155.52 Mb/sec (SONET STS-3c) with a cell size of 53 bytes comprising a 5 byte header and a 48 byte payload. This corresponds to a bit time of 6.4 ns and a cell time of 2.83 $\mu$s. From the standpoint of building a switch for use in a trunk and exchange network to switch ATM cells, the short cell time poses a problem, because the switch must reconfigure itself for every ATM cell entering the switch.

To overcome the reconfiguration problem a switch for switching ATM cells may make use of a Batcher-banyan network. The Batcher-banyan network is a self-routing network which, in a switch cycle, is capable of routing a plurality of packets or data cells which synchronously arrive at the network inputs to the network outputs without centralized control. The routing of each cell through the Batcher-banyan network is determined by an address contained in the cell header.

The Batcher-banyan network comprises a Batcher sorting network followed by a banyan routing network. The function of the Batcher sorting network is to arrange a set of incoming data cells in ascending or descending order according to their destination addresses. The function of the banyan network is to route the sorted data cells to the outputs indicated by the destination addresses.

A banyan network can route a data cell from any input to any specific output indicated by an address in the cell, but may suffer from internal congestion when two or more cells attempt to be routed to the same output at the same time. However, the banyan network is internally non-blocking if in a particular switch cycle no more than one incoming cell is addressed to each banyan output and the cells are arranged in ascending or descending order when they arrive at the banyan inputs. Therefore, it is possible to construct a non-blocking network by combining a Batcher sorting network and a banyan routing network.

An N-input by N-output (NxN) Batcher or banyan network is formed by a rectangular array of 2×2 switching elements. Each Batcher or banyan switching element has first and second inputs ($i_0$ and $i_1$) and first and second outputs ($O_0$ and $O_1$). The inputs and outputs are connected in a pass state ($i_0 \rightarrow O_0$, $i_1 \rightarrow O_1$) or a cross state ($i_0 \rightarrow O_0$, $i_1 \rightarrow O_1$) according to the value of particular bits in the data cells present at the two inputs. Each 2×2 switching element includes state determination logic which determines whether the switching element should change its state (from pass to cross or from cross to pass) for the particular data cells present at the first and second inputs. The state determination logic is different depending on whether the switching element is a Batcher element or a banyan element.

Illustratively N is 256 so that a Batcher-banyan network may accommodate up to 256 cell channels. By using VLSI technology, many of the 2×2 processing elements may be implemented in a single VLSI chip.

One way to increase the speed of such a large Batcher-banyan network so that it may be used to switch ATM cells is to utilize the unique chip designs disclosed in U.S. Pat. No. 4,910,730. This patent discloses a Batcher-banyan network which may be implemented using only two different IC chip designs. The chips are arranged in adjacent vertical and horizontal stacks to minimize the length of electrical conductors connecting the chips. This minimizes propagation delays between chips in the Batcher-banyan network and places the speed bottleneck on the individual 2×2 switching elements.

A variety of designs for the 2×2 switching elements utilized in a Batcher-banyan network have been proposed (see, e.g., N. H. E. Weste and K. Eshrghian, "Principles of CMOS VLSI Design", Addison Wesley, Reading, Mass., 1985, pp 439, and the above-mentioned U.S. Pat. No. 4,910,730). However, these prior art 2×2 switching cells are highly complex and/or are too slow to process bit streams comprising ATM cells.

Accordingly, it is an object of the present invention to provide a design for the 2×2 switching elements utilized in Batcher and banyan networks, which design is fast enough to switch ATM bit streams and very simple and compact.

SUMMARY OF THE INVENTION

In accordance with the present invention, a 2×2 switching element, such as a 2×2 Batcher switching element or a 2×2 banyan switching element, utilizes pipelined processing and dynamic (i.e. charge storage) logic structures to control whether the switching element is in the pass state or the cross state. This enables the Batcher and banyan switching elements to be fast enough to switch data cells which are transmitted using the Asynchronous Transfer Mode and to have a very simple design.

In a preferred embodiment, a 2×2 switching element comprises first and second inputs for synchronously receiving first and second sequences of ATM data cells or other data packets, respectively, and first and second outputs. First and second multiplexers associated with the first and second outputs select the pass state or the cross state for the 2×2 switching element.

The multiplexers are controlled by a pipelined processing circuit. The pipelined processing circuit includes a first pipeline stage comprising a logic circuit for processing one or more bits from each of the data cells arriving at the first and second inputs of the switching element. In response to these bits, the logic circuit makes a determination as to whether or not the switching element should change its state from cross to pass or from pass to cross or remain the same. The logic circuit is different depending on whether the switching element is a Batcher switching element or a banyan switching element as these two types of switching elements switch data cells according to different algorithms.

The pipelined processing circuit also includes a second pipeline stage which is responsive to the state change determination of the logic circuit of the first pipeline stage and which stores a signal for controlling whether a pass or a cross state is assumed by the multiplexers. To store the signal for controlling whether a pass state or a cross state is selected, the second pipeline stage comprises a dynamic latch circuit. To change the state of the switching element from cross to pass or from pass to cross the signals stored in the latch circuit are changed. In the Batcher switching element, the dynamic latch circuit comprises a dynamic flip-flop, one dynamic latch for selecting the pass state and a second dynamic latch for selecting the cross state. The signal values stored in the first and second dynamic latches of the Batcher switching element are always complementary. In the banyan switching element, the dynamic latch circuit comprises a dynamic latch and a dynamic flip-flop connected in series.

A dynamic latch includes one or more charge storage devices (as opposed to refresh or static devices) for storing a charge indicative of the pass or cross state. The charge is stored for a time longer than the time of the ATM cells or other data packets to be switched. This enables the switching element to hold its state at least until the next switching decision is made for the next pair of cells which arrive at the switching element inputs without the use of complex reset circuitry and without the use of refresh circuitry or more complicated static devices.

First and second dynamic shift registers are connected to the first and second inputs of the 2×2 switching element. These shift registers enable the pipelined processing circuit to receive as inputs certain bits from the arriving data cells to be switched and to delay the propagation of data bits through the 2×2 switching element while state determinations are made.

In short, the use of pipelined processing in combination with the use of dynamic latches formed from charge storage devices results in a unique 2×2 switching element which is simple, compact, and high speed.

DETAILED DESCRIPTION OF THE INVENTION

The detailed description of the invention is divided into three sections. Section A contains an overview of the structure of a Batcher-banyan network. Section B contains a description of a 2×2 Batcher switching element in accordance with the present invention. Section C contains a description of a 2×2 banyan switching element in accordance with the present invention.

A. Batcher-banyan network

Figure 1:
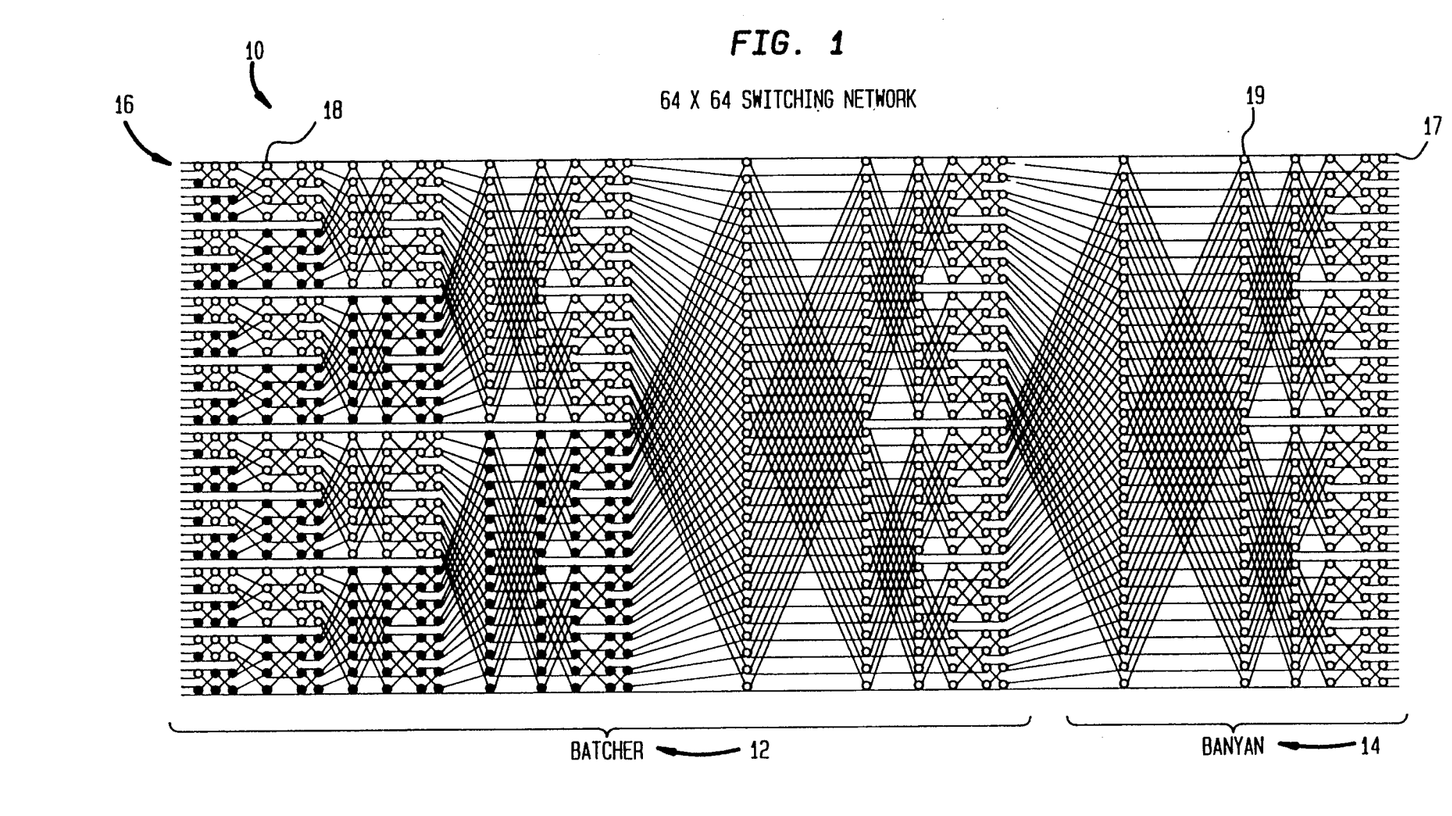
FIG. 1 schematically illustrates a Batcher-banyan network.

FIG. 1 shows a Batcher-banyan network 10 having N inputs 16 and N outputs 17, where N=64. The Batcher-banyan network 10 can route a set of ATM data cells which synchronously arrive at the inputs 16 to the specific outputs 17 indicated in the cell headers. The Batcher-banyan network 10 comprises a Batcher network 12 and a banyan network 14. As indicated above, the Batcher network 12 sorts incoming data cells according to a destination address contained in the cell header and the banyan network routes these cells to the destination addresses. The Batcher network is made up of the 2×2 switching elements 18 and the banyan network is made up of the 2×2 switching elements 19. As can be seen in FIG. 1, the switching elements 18 and 19 are arranged in columns. The Batcher network comprises $\log_2 N \cdot (\log_2 N + 1)/2$ columns with N/2 switching elements 18 in each column. The banyan network comprises $\log_2 N$ columns with N/2 switching elements 19 in each column. To form the Batcher and banyan networks, the columns of switching elements are interconnected using the perfect shuffle and binary wiring patterns as disclosed in U.S. Pat. No. 4,910,730. Each of the switching elements 18 and 19 synchronously receives two data cells at its inputs and is placed in the pass state or the cross state so that the data cells are routed to the appropriate outputs.

There are two types of switching elements 18 in the Batcher network 12 of FIG. 1, black switching elements (shaded) and white switching elements (unshaded). The routing of each switching element 18 is determined by the destination addresses in the two data cells synchronously arriving at the inputs of the switching element. The white switching elements are placed in the pass state or the cross state to route the data cell with the larger destination address to the lower output and the black switching elements are placed in the pass state or the cross state to route the data cell with larger destination address to the upper output. In addition, the Batcher switching element may be disabled so that it statically maintains the pass state.

State resolution for a banyan element 19 is dictated by the element's position in the banyan network. The banyan element routes an incoming data cell at the first or second input with an x (i.e. a zero or one) in a prescribed bit position (the route bit) of a valid address to the output $O_x$. Generally, a data cell address is deemed valid when the bit preceding the address (the activity bit) is set to logical "1". The first banyan element 19 in the banyan network to be traversed by a data cell routes according to the first bit in the address field, the second banyan element traversed by the data cell routes according to the second bit in the address field, etc. After a state decision is made by a banyan element, the element moves the route bit for the next subsequent banyan element to the position directly after the activity bit. This is done so that each banyan element can be made identically and so that buffer requirements of the banyan switching element can be reduced. Bit movement is performed by circular rotation of the address field so that when a cell departs the banyan network its address is restored to its original form. The banyan element may also be disabled so that it statically maintains the pass state.

B. 2×2 Batcher Switching Element

Figure 2:
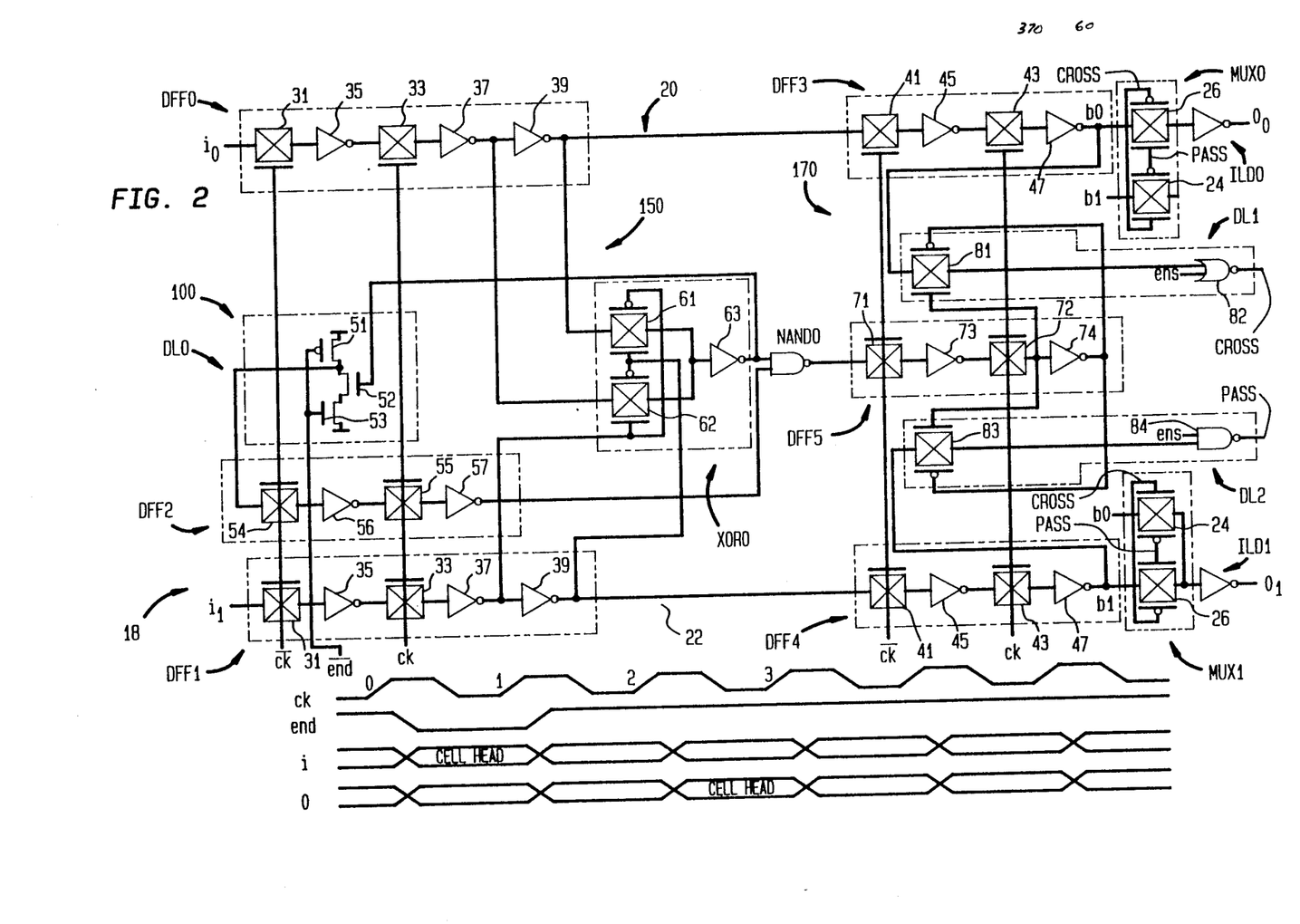
FIG. 2 schematically illustrates a 2×2 Batcher switching element in accordance with an illustrative embodiment of the present invention.

A Batcher switching element 18 in accordance with an illustrative embodiment of the present invention is illustrated in FIG. 2. The Batcher switching element 18 of FIG. 2 has two inputs $i_0$ and $i_1$ and two outputs $O_0$ and $O_1$.

First and second ATM data cells or other data packets to be switched arrive synchronously at the inputs $i_0$ and $i_i$. The data bits comprising the first cell are transmitted along a first data path 20 which comprises the dynamic flip-flops DFF0 and DFF3. The dynamic flip-flops DFF0 and DFF3 together form a two-stage dynamic shift register. The data bits comprising the second cell are transmitted along a second data path 22 which comprises the dynamic flip-flops DFF1 and DFF4. The dynamic flip-flops DFF1 and DFF4 together form a second two-stage dynamic shift register. The dynamic flip-flops DFF0 and DFF1 each comprise a first CMOS transmission gate 31, a second CMOS transmission gate 33 and the inverters 35, 37, and 39. The Dynamic flip-flops DFF3 and DFF4 each comprise a first CMOS transmission gate 41, a second CMOS transmission gate 43 and two inverters 45 and 47.

Associated with the outputs $O_0$ and $O_1$ are the inverting line drivers ILD0 and ILD1, respectively, and the multiplexers MUX0 and MUX1, respectively. Each of the multiplexers MUX0 and MUX1 comprises two CMOS transmission gates 24 and 26. As shown in FIG. 2, each of the multiplexers MUX0 and MUX1 includes terminals for receiving pass and cross signals for selecting the pass state or the cross state for the Batcher switching element 18. The pass and cross signals are always complementary. When the pass signal is high, the terminal $b_0$ of DFF3 is connected via the CMOS transmission gate 26 of MUX0 to the input of ILD0 and the terminal $b_1$ of DFF4 is connected via the CMOS transmission gate 26 of MUX1 to the input of ILD1. Thus in the pass state, data bits arriving at $i_0$ are transmitted to $O_0$ and data bits arriving at $i_1$ are transmitted to $O_1$. When the cross signal is high, the terminal $b_0$ of DFF3 is connected via the CMOS transmission gate 24 of MUX1 to the input of ILD1 and the terminal $b_1$ of DFF4 is connected via the transmission gate 24 of MUX0 to the input of ILD0. Thus, in the cross state, the data bits arriving at $i_0$ are transmitted to $O_1$ and the data bits arriving at $i_1$ are transmitted to $O_0$.

The pass and cross signals are generated by a two stage pipelined processing circuit 100. The first stage 150 of the pipelined processing circuit comprises the dynamic latch DL0, the dynamic flip-flop DFF2, the exclusive-or gate XOR0, and the NAND gate NAND0. The dynamic latch DL0 comprises three gates MOS transistors 51, 52, 53. The dynamic flip-flop DFF2 comprises the first CMOS transmission gate 54, the second CMOS transmission gate 55 and the inverters 56 and 57. The gate XOR0 comprises the CMOS transmission gates 61 and 62 and the inverter 63.

The second stage 170 of the pipelined processing circuit 100 comprises the dynamic flip-flop DFF5 and the dynamic latches DL1 and DL2. The dynamic flip-flop DFF5 comprises the CMOS transmission gates 71 and 72 and the inverters 73 and 74. The dynamic latch DL1 comprises the CMOS transmission gate 81 and the NOR gate 82. The dynamic latch DL2 comprises the CMOS transmission gate 83 and the NAND gate 84.

The output of the dynamic latch DL1 is the cross signal which is applied to the multiplexers MUX0 and MUX1 to select the cross state. The output of the dynamic latch DL2 is the pass signal which is applied to the multiplexers MUX0 and MUX1 to select the pass state. Each of the gates 82 and 84 has an input for receiving an enable (ens) signal. When this signal is logic LOW the Batcher switching element is always in the pass state.

The first stage 150 of the pipelined circuit 100 serves to compare bits of the arriving bit streams at $i_0$ and $i_1$ for making a state change determination. When a difference is detected, a signal is latched in the second stage 170 of the pipelined circuit and applied to the multiplexers to determine the state of the switching element.

The dynamic shift registers formed by DFF0 and DFF3 and DFF1 and DFF4 enable the first stage 150 of the pipelined processing circuit 100 to gain access to the arriving bits to make a state change determination. The shift registers also delay the propagation of arriving bits through the 2×2 switching element so that there is enough time for the state determination circuitry to make a state change determination and for the state determination signals (pass and cross) to be applied to the multiplexers as the bits arrive at the multiplexers.

In FIG. 2, "ck" indicates the clock signal which is applied to the Batcher switching element 18 of FIG. 2, $\overline{end}$ indicates a control signal, "i" and "o" represent the timing of the data cells at $i_0$ and $i_1$ and $O_0$ and $O_1$, respectively.

The detailed operation of the Batcher switching element 18 of FIG. 2 may be understood as follows.

After the rising edge of the clock signal "ck" labelled "0", $\overline{end}$ becomes LOW setting dynamic latch DL0. Also occurring after rising clock edge "0", is the arrival of the first bit of each new cell, one arriving at the input marked $i_0$ and another arriving at the input $i_1$.

At the rising clock edge labelled "1", the HIGH level at the output of DL0 is latched at the output of dynamic flip-flop DFF2. This enables the inverse of the output of exclusive-or gate XOR0 to be latched by DFF5 at the rising clock edge labelled "2" through NAND-gate NAND0. The inputs to XOR0 are the outputs of DFF0 and DFF1. After clock edge "1", DFF0's output contains the value of the first bit of the new cell that arrived at input $i_0$ and DFF1's output contains the first bit of the new cell that arrived at input $i_1$. Either these two bits differ (scenario I) or they do not (scenario II).

In scenario I, XOR0's output becomes HIGH, which clears DL0 and brings the input to DFF5 LOW. The rising clock edge labelled "2" causes DFF5's output to go LOW, DFF2's output to go LOW, DFF3's output to assume the inverted value of the first bit of the cell arriving at input $i_0$, and DFF4's output to assume the inverted value of the first bit of the cell arriving at input $i_1$. The logic ZERO at the output of DFF5 enables dynamic latches DL1 and DL2, allowing each to take on the value of DFF3's and DFF4's output, respectively. If the output of DFF3 is ZERO and the output of DFF4 is ONE, DL1 is set and DL2 is cleared. This causes the multiplexers MUX0 and MUX1 to take on the cross state, connecting the output of DFF3 to the input of inverting line diver ILD1 and the output of DFF4 with the input of inverting line driver ILD0. On the other hand if the output of DFF3 is ONE and the output of DFF4 is ZERO, DL2 is set and DL1 is cleared. This causes the multiplexers MUX0 and MUX1 to take on the pass state, connecting the output of DFF3 to the input of ILD0 and the output of DFF4 with the input of ILD1. Since the output of DFF2 is now LOW, the input to DFF5 will be HIGH independent of the output of XOR0. The rising clock edge labelled "3" will bring DFF5's output HIGH disabling the dynamic latches DL1 and DL2. The Batcher element will maintain the state determined in the previous clock period, and keep this state at least until the next time $\overline{end}$ becomes LOW followed by a bit difference at the inputs $i_0$ and $i_1$.

In scenario II, XOR0s output becomes LOW, bringing the input to DFF5 HIGH while having no effect on the output of DL0. The rising clock edge labeled "2" causes DFF5's output to go HIGH, DFF2's output to go HIGH, DFF3's output to assume the inverted value of the first bit of the cell arriving at the input $i_0$, and DFF4's output to assume the inverted value of the first bit of the cell arriving at the input $i_1$. The logic ONE at the output of DFF5 has no effect on the output of dynamic latches DL1 and DL2. The Batcher element does not go through a state change; the outputs of DFF3 and DFF4 are connected to the inputs of ILD0 and ILD1 through whatever state the element maintained in the previous clock period. It follows that as long as scenario II exists at clock edge x, the HIGH level at the output of DL0 is latched at the output of dynamic flip-flop DFF2. This enables the inverse of the output of exclusive-or gate "XOR0" to be latched by DFF5 at rising clock edge labeled "x+1" through nand gate NAND0. After clock edge "x", DFF0's output contains the value of the xth bit of the cell that arrived at the input $i_0$ and DFF1's output contains the value of the xth bit of the cell that arrived at the input $i_1$. Once these two bits differ (scenario I), the element determines a new state and remains in that state until the next time $\overline{end}$ becomes zero followed by a bit difference at the inputs $i_1$ and $i_0$.

In short, when a pair of new data cells arrives at the inputs $i_0$ and $i_1$ the $\overline{end}$ signal sets the dynamic latch DL0 in the first stage 150 of the pipelined circuit 100. Following that, a bit serial comparison is performed by the exclusive-or gate XOR0 on each successive pair of bits arriving at the inputs $i_0$ and $i_1$. As long as the bits being compared do not differ they are passed from the shift registers in the data paths 20 and 22 to the outputs $O_0$ and $O_1$ according to the current state of the element. When a difference is detected, the bit comparison circuit XOR0 is disabled and a signal indicative of the difference is latched in the second stage of the pipelined processing circuit and applied to the multiplexers. The state of the element is changed only when a difference requiring a state change is detected.

This algorithm has several advantages. First, bit serial comparison is performed until a bit difference is detected, rather than being externally terminated at the end of the destination address field. In addition, no reset logic is provided to change the state of the switching element at the start of a new data cell cycle. This does not affect the sorting nature of the Batcher element since until the difference is detected the outputs will be identical. These advantages allow for smaller and faster switching element structures.

The 2×2 Batcher switching element 18 illustrated in FIG. 2 utilizes a number of dynamic logic structures such as the dynamic latches DL1 and DL2. The dynamic latches DL1 and DL2 are formed utilizing the CMOS transmission gates 81 and 83. These CMOS transmission gates maintain their state by storing a charge but are not refreshed. It is the extremely short bit and cell times characteristic of the ATM transmission technique which permits the exploitation of dynamic charge storage devices in the dynamic latches DL1 and DL2 and elsewhere in the switching element 18 to achieve the high switching speeds necessary for switching ATM data cells and a highly compact switching element structure.

In particular, the element state is maintained by the CMOS transmission gates 81 and 83 contained in the dynamic latches DL1 and DL2. However, the charge isolation of these storage devices is not perfect. For example, in 1.2 $\mu$m CMOS technology, there is a 0.5 volt decay in state voltage in 1.8 ms, a period of time which is much longer than the duration of an ATM cell. Thus, the dynamic storage devices 81 and 83 will hold their state for a duration in excess of the time between state determination decisions. Accordingly, when the dynamic charge storage devices 81 and 83 are utilized, it is not necessary to reset the state of the element at the start of each new cell cycle, rather the state of the element is maintained until the bit comparison circuit detects a bit value difference requiring a change in state.

C. 2×2 Banyan Switching Element

Figure 3A:
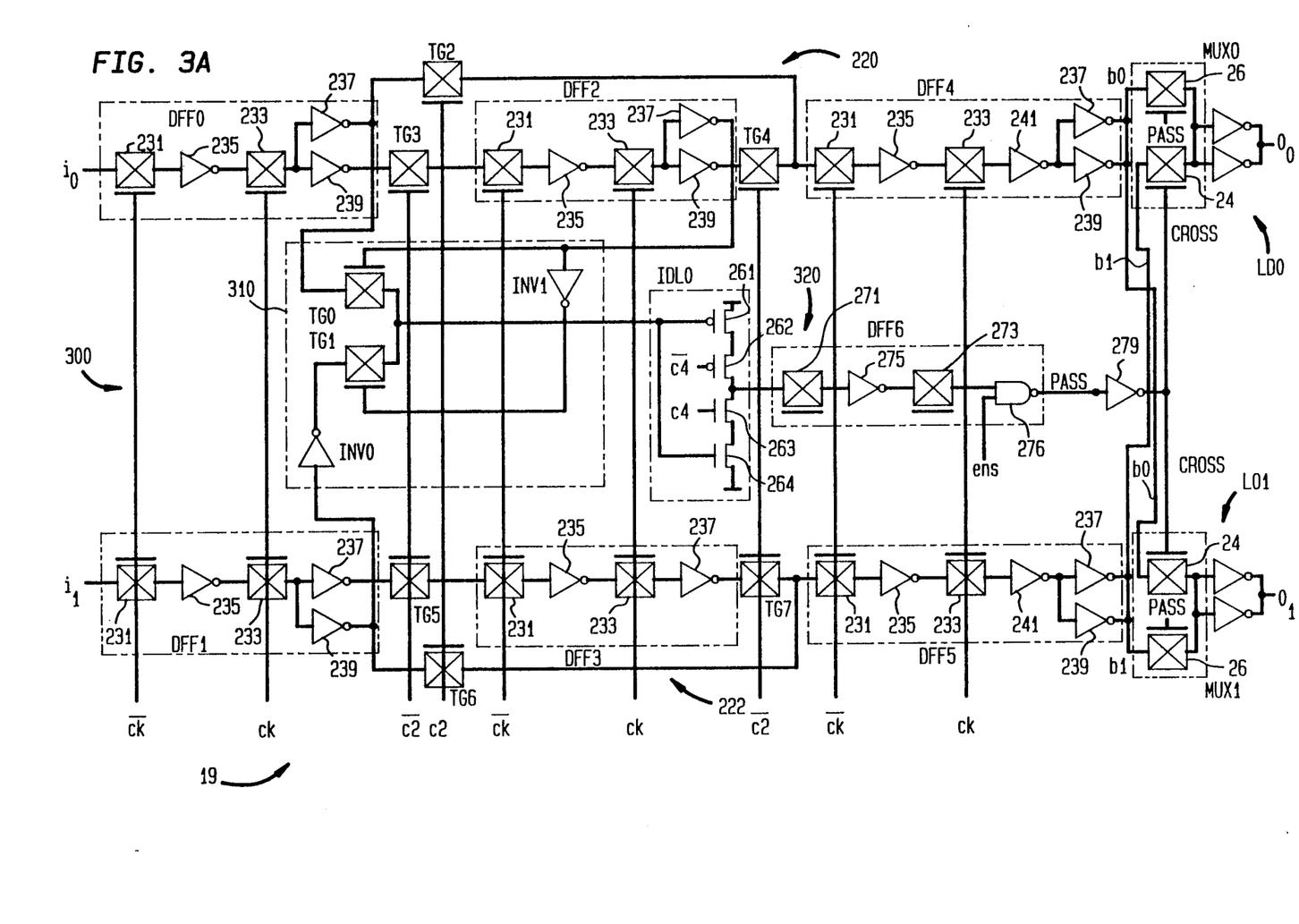
FIG. 3A schematically illustrates a 2×2 banyan switching element in accordance with an illustrative embodiment of the present invention.

A banyan switching element 19 in accordance with the present invention is shown in FIG. 3A. Like the Batcher switching element discussed above, the banyan switching element of FIG. 3A makes use of pipelined processing and non-refreshable dynamic charge storage devices to achieve a simple and compact design and a switching speed which is fast enough to switch ATM cells.

The banyan switching element 19 of FIG. 3 has two inputs $i_0$ and $i_1$ and two outputs $O_0$ and $O_1$.

First and second ATM data cells or other packets to be switched arrive synchronously at the inputs $i_0$ and $i_1$. The data bits comprising the first cell are transmitted along a first data path 220 which comprises the dynamic flip-flops DFF0, DFF2, and DFF4 and the transmission gates TG2, TG3, and TG4. The dynamic flip-flops DFF0, DFF2, and DFF4 together form a first three-stage dynamic shift register. The data bits comprising the second cell are transmitted along a second data path 222 which comprises the dynamic flip-flops DFF1, DFF3 and DFF5 and the transmission gates TG5, TG6, and TG7. The dynamic flip-flops DFF1, DFF3, and DFF5 form a second three-stage dynamic shift register. The dynamic flip-flops DFF0, DFF1, DFF2, DFF4, and DFF5 each comprise the transmission gates 231 and 233, and the inverters 235, 237, and 239. The flip-flops DFF4 and DFF5 each include the additional inverter 241 because the output line drives are inverting, while in the flip-flop DFF3 the inverter 239 is omitted because less drive strength is needed.

Associated with the outputs $O_0$ and $O_1$ are inverter units LD0 and LD1 and the multiplexers MUX0 and MUX1. As in the case of the Batcher switching element of FIG. 2, in the banyan switching element of FIG. 3A, each of the multiplexers MUX0 and MUX1 comprises two transmission gates 24 and 26. As shown in FIG. 3, each of the multiplexers MUX0 and MUX1 includes terminals for receiving pass and cross signals for selecting the pass state or the cross state for the banyan switching element 19. When the pass signal is high, the terminal $b_0$ of DFF4 is connected via the transmission gate 26 of MUX0 to the input of LD0 and the terminal $b_1$ of DFF5 is connected via the transmission gate 26 of MUX1 to the input of LD1. When the cross signal is high, the terminal $b_0$ of DFF4 is connected via the transmission gate 24 of MUX1 to the input of LD1 and the terminal $b_1$ of DFF5 is connected via the transmission gate 24 of MUX0 to the input of LD0.

The pass and cross signals are generated by a two-stage pipelined processing circuit 300. The first stage 310 of the pipelined processing circuit 300 is a logic circuit which comprises the transmission gates TG0 and TG1 and the inverters INV0 and INV1. The second pipeline stage 320 comprises the inverting dynamic latch IDL0 and the dynamic flip-flop DFF6. The inverting dynamic latch IDL0 is a charge storage device which comprises four transistors 261, 262, 263, and 264. The flip-flop DFF6 comprises the transmission gates 271 and 273, the inverter 275 and the NAND gate 276. One input to the NAND gate 276 is the enable signal "ens". If "ens" is LOW the banyan switching element 19 is maintained in the pass state independent of the content of the data cells.

The output of the flip-flop DFF6 is connected to an inverter 279. The output of the flip-flop DFF6 is the pass signal. When the output of DFF6 is high, the multiplexers MUX1 and MUX0 select the pass state. The output of the inverter 279 is the cross signal. When the output of the inverter 279 is high the multiplexers MUX0 and MUX1 select the cross state.

The data cell incident at the input $i_0$ has an activity bit $A_0$ which indicates whether or not the data cell is valid and an address field comprising the routing bits $Rn_0$ where n=0,1,2,... The data cell incident at the input $i_1$ has an activity bit $A_1$ and an address field comprising the routing bits $Rn_1$ where n=0,1,2,....

In the banyan cell 19 of FIG. 3, if the data cell incident on input $i_0$ is active (i.e. the activity bit $A_0$ of the cell is "1") then the element's state is determined according to the data cell's route bit $Rn_0$ which immediately follows the activity bit, wherein the pass state is taken for $Rn_0=0$ and the cross state is taken for $Rn_0=1$. If the packet incident at the input $i_0$ is inactive ($A_0=0$) then the element's state is determined according to the route bit $Rn_1$ which immediately follows the activity bit $A_1$ of the packet incident on input $i_1$, wherein the pass state is taken if $Rn_1=1$ and the cross state is taken if $Rn_1=0$.

The circuit 300 is pipelined so that the first stage 310 receives the activity and routing bits of the first and second data cells incident at the inputs $i_0$ and $i_1$ and makes a determination as to whether the state of the switching element should be pass or cross. The output of the first stage 310 is latched in the second stage 320 and the corresponding pass and cross signals are applied to the multiplexers. When the first stage 310 determines that the state of the element has to be changed, the signal latched in the second stage is also changed.

Figure 3B:
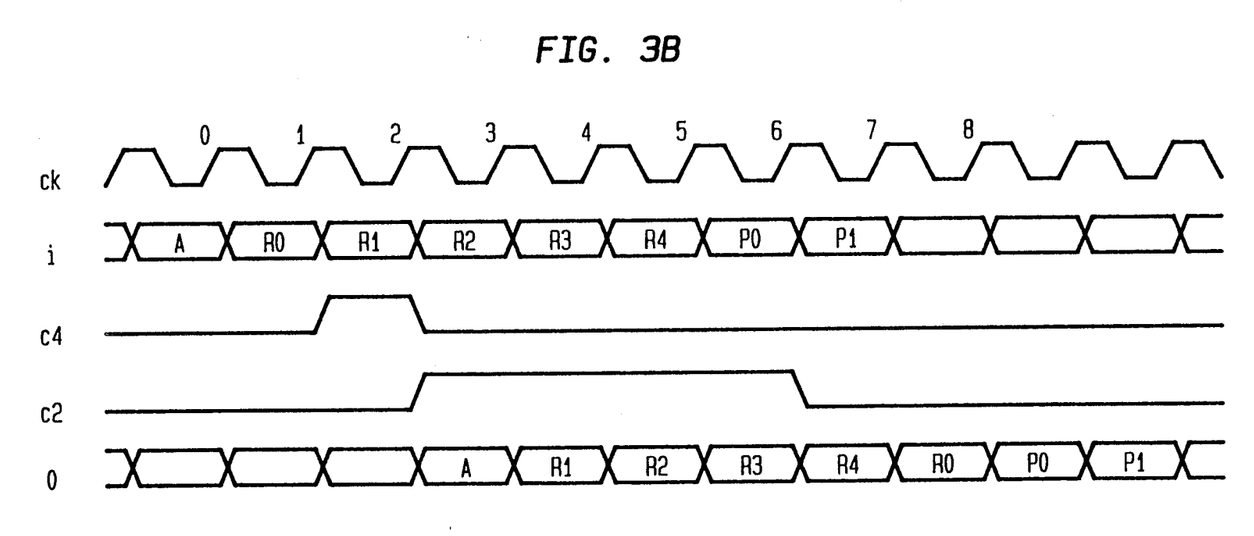
FIG. 3B illustrates the timing of the signals utilized in the banyan switching element of FIG. 3A.

In FIG. 3B, the signal "ck" is a clock signal, the signals "c4" and "c2" are control signals, and "i" and "O" represent the timing of the data cells at the inputs and outputs of the banyan switching element. As shown in the lines labelled "i" and "o" of FIG. 3, the data cells are shown as each having an activity bit A followed by five routing bits R0, R1, R2, R3, and R4 and the payload bits P0, P1, etc. It should be noted that the first route bit R0 is rotated to end of the address field by the switching element 19 of FIG. 3.

The operation of the banyan cell 19 of FIG. 3 may be understood in detail as follows.

The rising edge of clock signal ck labelled "0" latches $A_0$, the activity bit of the cell arriving at input $i_0$, and $A_1$, the activity bit of the cell arriving at input $i_1$ at the outputs of the dynamic flip-flops DFF0 and DFF1 respectively.

At the rising clock edge labelled "1", control signal "c2" is LOW enabling transmission gates TG3, TG5, TG4, and TG7 and disabling TG2 and TG6. This causes clock edge "1" to latch DFF0's and DFF1's outputs at DFF2's and DFF3's outputs, respectively. Also occurring at the clock edge labelled "1", DFF0 latches $R0_0$, the route bit of the cell arriving at the input terminal $i_0$, and DFF0 latches $R0_1$, the route bit of the cell arriving at the input $i_1$.

After the rising edge of clock signal labelled "1", control signal "c4" becomes HIGH. This enables inverting dynamic latch IDL0; that is when "c4" is HIGH the output of IDL0 follows the inverse of its input and when "c4" makes a transition from HIGH to LOW the inverse of the signal at IDL0's input is latched at its output. Connected to IDL0's input is the output of combinatorial logic whose inputs are the outputs of DFF0, DFF1, and DFF2. The combinatorial logic comprises two inverters (INV0 and INV1) and two transmission gates (TG0 and TG1) and performs the function f, where $$f = (\text{DFF2 output AND DFF0 output}) \text{ OR}$$

$$(\overline{\text{DDF2 output}} \text{ AND } \overline{\text{DFF1 output}}).$$

Due to the particular information at its input after rising clock edge "1", the combinatorial logic output equals $$(A_0 \text{ AND } R0_0) \text{ OR } (\overline{A_0} \text{ and } \overline{R0_1}).$$

This causes the output of IDL0 to become $$\overline{(A_0 \text{ AND } R0_0) \text{ OR } (\overline{A_0} \text{ AND } R0_1)}.$$

At the rising clock edge labelled "2", "c2" is still LOW. This causes the clock edge to latch the outputs of DFF0, DFF1, DFF2, and DFF3 at the outputs of DFF2, DFF3, DFF4, and DFF5, respectively. In addition, $R1_0$ is latched at DFF0's output and $R1_1$ is latched at DFF1's output. At the rising clock edge labelled "2" the output of IDL0 is latched at DFF6's output. This in turn sets the two transmission gate multiplexers MUX0 and MUX1 to the appropriate state so that the cells depart the banyan element via the proper outputs.

After the rising clock edge labelled "2" and prior to any change at the input to IDL0, control signal "c4" becomes LOW thus latching the proper state of the banyan element at IDL0's output. "c4" will not become HIGH again until a new set of packets arrive at the element's input terminals.

After the rising clock edge labelled "2" and prior to any changes at the inputs of DFF2 and DFF3, control signal "c2" becomes HIGH disabling TG3, TG5, TG4, and TG7 and enabling TG2 and TG6. This serves to isolate the inputs and outputs of DFF2 and DFF3 from the rest of the banyan circuit trapping the value of $R0_0$ at the input of DFF2 and the value of $R0_1$ at the input of DFF3. It also serves to connect the outputs of DFF1 and DFF2 to the inputs of DFF4 and DFF5. The later two steps are for rotating the address fields of the data cells. The above condition remains unchanged for subsequent clock cycles until control signal "c2" is brought LOW, disabling TG2 and TG6 and enabling TG3, TG5, TG4, and TG7. The following rising clock edge (depicted as "7") latches the outputs of DFF0, DFF1, DFF2, and DFF3 at the outputs of DFF2, DFF3, DFF4, and DFF5 respectively. In addition, $P0_0$, the first payload bit of the cell arriving at input $i_0$ is latched at DFF0's output and $P0_1$, the first payload bit of the cell arriving at input $i_1$ is latched at DFF1's output. The HIGH to LOW transition of "c2" completes the rotation of the cell address. Another cell address rotation will not commence until the next LOW to HIGH transition of "c2".

CONCLUSION

A 2×2 Batcher switching element and a 2×2 banyan switching element are disclosed. These switching elements utilize pipelined processing and dynamic logic structures. This enables the switching elements to have a highly compact design and a switching speed which is fast enough to switch ATM data cells. Finally, the above-described embodiments of the invention are intended to be illustrative only. Numerous alternative embodiments may be devised by those skilled in the art without departing from the spirit and scope of the following claims.

We claim:

1. A 2×2 switching element for switching ATM cells comprising:
    first and second inputs for synchronously receiving first and second ATM data cells,
    first and second outputs,
    first and second data paths respectively connected to said first and second inputs and each comprising shift register means comprising a plurality of dynamic flip-flops,
    multiplexing means for selecting a pass state in which said first path connects data from said first input to said first output and said second path connects data from said second input to said second output or a cross state in which said first path connects data from said first input to said second output and said second path connects data from said second input to said second output, and
    pipelined processing means for controlling said multiplexing means including a first pipeline state comprising a logic circuit for processing one or more bits in said first and second cells for making a state determination for said switch element, said logic circuit being connected to said shift registers means of said first and second data paths, and a second pipeline stage responsive to said logic circuit and including a dynamic flip-flop and dynamic latch means for storing signal indicative of said pass or cross state and for applying said signal to said multiplexing means to cause said multiplexing means to select said pass state or said cross state, said dynamic latch means comprising a charge storage device for storing a charge indicative of said signal for a duration longer than the duration of ATM cell.

2. A switching element in accordance with claim 1 wherein said logic circuit comprises an exclusive- or gate, a NAND circuit, and a dynamic latch circuit and said dynamic flip-flop of said second pipe line stage is connected to the output of said NAND gate and said dynamic latch means of said second pipeline stage comprises a first and second dynamic latch circuit connected to said second stage dynamic flip, one of said second stage dynamic latch circuits applying said cross signal and the other of said dynamic latch circuit applying said pass signal.

3. A switching circuit in accordance with claim 1 wherein said logic circuit comprises gate means and inverters and said second pipe line stage dynamic latch means is connected to the output of said gate means and the output of said second stage dynamic flip-flop provides the pass and cross signals to said multiplexing means.

4. A 2×2 switching element for switching ATM cells comprising:
    first and second inputs for synchronously receiving first and second ATM data cells,
    first and second outputs,
    multiplexing means for selecting a pass state in which said first input is connected to said first output and said second input is connected to said second output or a cross state in which said first input is connected to said second output and said second input is connected to said first output, and
    pipelined processing means for controlling said multiplexing means including a first pipeline stage comprising a logic circuit for processing one or more bits in said first and second cells for making a state change determination for said switching element, and a second pipeline stage responsive to said logic circuit and including dynamic latch means for storing a signal indicative of said pass or cross state and for applying said signal to said multiplexing means to cause said multiplexing means to select said pass state or said cross state, said dynamic latch means comprising a charge storage device for storing a charge indicative of said signal for a duration longer than the duration of an ATM cell, and
    wherein said multiplexing means comprises a first multiplexer connected to said first output and a second multiplexer connected to said second output, each of said first and second multiplexers comprising a pair of CMOS transmission gates.

5. A 2×2 Batcher switching element for switching ATM cells comprising:
    first and second inputs for synchronously receiving first and second ATM data cells,
    first and second outputs,
    multiplexing means for selecting a pass state in which said first input is connected to said first output and said second input is connected to said second output or a cross state in which said first input is connected to said second output and said second input is connected to said first output, and
    pipelined processing means for controlling said multiplexing means including a first pipeline stage comprising a logic circuit for processing one or more bits in said first and second cells for making a state change determination for said switching element, and a second pipeline stage responsive to said logic circuit and including dynamic latch means for storing a signal indicative of said pass or cross state and for applying said signal to said multiplexing means to cause said multiplexing means to select said pass state or said cross state, said dynamic latch means comprising a charge storage device for storing a charge indicative of said signal for a duration longer than the duration of an ATM cell, said logic circuit of said first pipeline stage comprising bit comparison means for comparing corresponding bits in said first and second ATM cells and means for enabling said bit comparison means when said first and second ATM cells arrive at said inputs and for disabling said bit comparison means when a difference in value between corresponding bits in said first and second cells is detected by said bit comparison means, and said second pipeline stages comprising a dynamic flip-flop connected to said logic circuit, a first dynamic latch for storing a signal indicative of the pass state and a second dynamic latch for storing a signal indicative of the cross stage, said first and second latches each comprising a charge storage device in the form of a CMOS transmission gate.

6. A 2×2 banyan switching element for switching ATM cells comprising:

first and second inputs for synchronously receiving first and second ATM data cells, first and second outputs, multiplexing means for selecting a pass state in which said first input is connected to said first output and said second input is connected to said second output or a cross state in which said first input is connected to said second output and said second input is connected to said first output, and pipelined processing means for controlling said multiplexing means including a first pipeline stage comprising a logic circuit for processing one or more bits in said first and second cells for making a state change determination for said switching element, and a second pipeline stage responsive to said logic circuit and including dynamic latch means for storing a signal indicative of said pass or cross state and for applying said signal to said multiplexing means to cause said multiplexing means to select said pass state or said cross state, said dynamic latch means comprising a charge storage device for storing a charge indicative of said signal for a duration longer than the duration of an ATM cell, and wherein said first cell has a first activity bit $A_0$ and a route bit $R_0$ and said second cell has a second activity bit $A_1$ and a route bit $R_1$ and wherein said logic circuit performs the function $$(A_0 \text{ and } R_0) \text{ or } (\overline{A_0 \text{ and } R_1})$$

7. The switching element of claim 6 wherein the signal of the output of said dynamic latch means is $$\overline{(A_0 \text{ and } R_0) \text{ or } (\overline{A_0} \text{ and } R_1)}$$

8. A Batcher switching element comprising first and second inputs for synchronously receiving first and second sequences of data cells, first and second outputs, multiplexing means for selectively connecting said inputs and outputs in a pass state or a cross state, and a two-stage pipelined processing circuit including a first stage comprising a bit comparison circuit for comparing corresponding bits in said first and second sequences of data cells and a second stage comprising a first dynamic latch for latching a first signal indicating that said Batcher switching element should be in the pass state and for applying the first signal to said multiplexing means, a second dynamic latch for latching a second signal indicating that said Batcher switching element should be in the cross state and for applying said second signal to said multiplexing means, and means responsive to said bit comparison circuit for causing one of said dynamic latches to be set and the other of say dynamic latches to be cleared, said first and second dynamic latches comprising first and second non-refreshable charge storage devices, respectively, for storing charges corresponding to said first and second signals for a time longer than a cell time.

9. A 2×2 banyan switching element comprising:

first and second inputs for receiving first and second synchronous streams of data cells, first and second outputs, first and second data paths connected to said first and second inputs, said first and second data paths including first and second dynamic shift registers each having first, second and third bit positions, first and second multiplexers connected to said first and second outputs, respectively, for selecting a pass state wherein said first data path is connected to said first output and said second data path is connected to said second output, or a cross state wherein said first data path is connected to said second output and said second data path is connected to said first output, a logic circuit connected to said first and second shift registers and operative during first and second clock cycles when an activity bit and a routing bit of a data cell from each of the first and second streams occupy the second shift registers, respectively, for making a state determination, a dynamic latch responsive to said logic circuit and operative during a third clock cycle when said activity bit and said routing bit of the data cells have shifted to said third and second bit positions of said shift registers, respectively, for latching a signal indicative of whether said switching element should be in the pass state or the cross state to control said multiplexers, said dynamic latch comprising a dynamic charge storage device having a charge storage time substantially longer than the duration of a data cell, and a dynamic flip-flop connected to said dynamic latch, the output of said dynamic flip-flop being applied to said first and second multiplexers.

* * * * *